Sept. 23, 1952  R. V. HIGGINS  2,611,643
AUTOMATIC SPRINKLING DEVICE
Filed Sept. 26, 1947
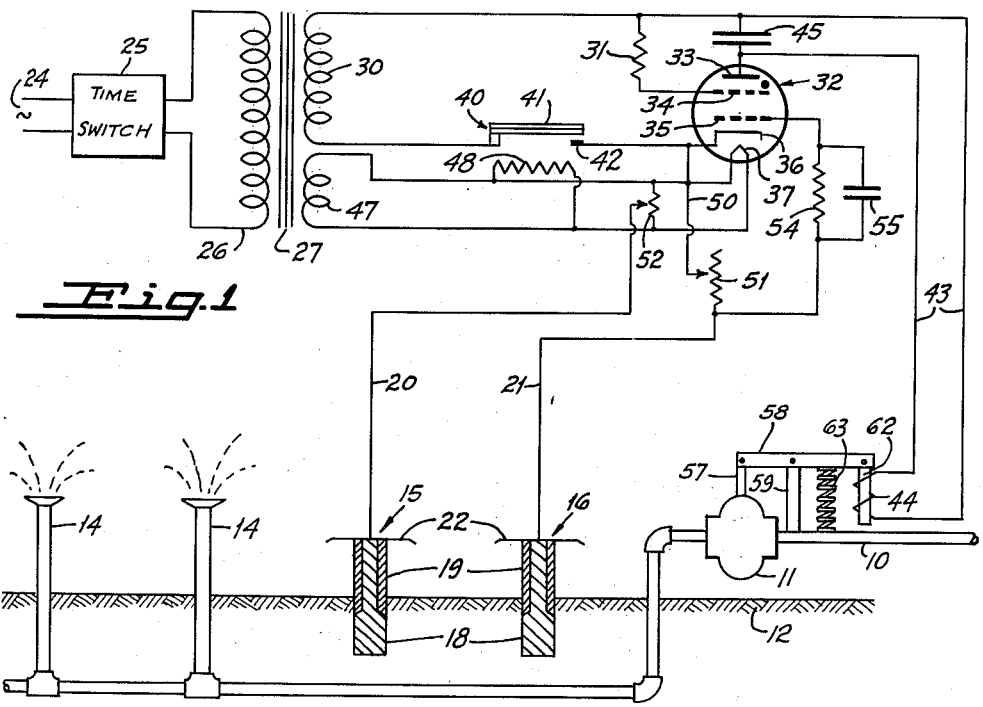
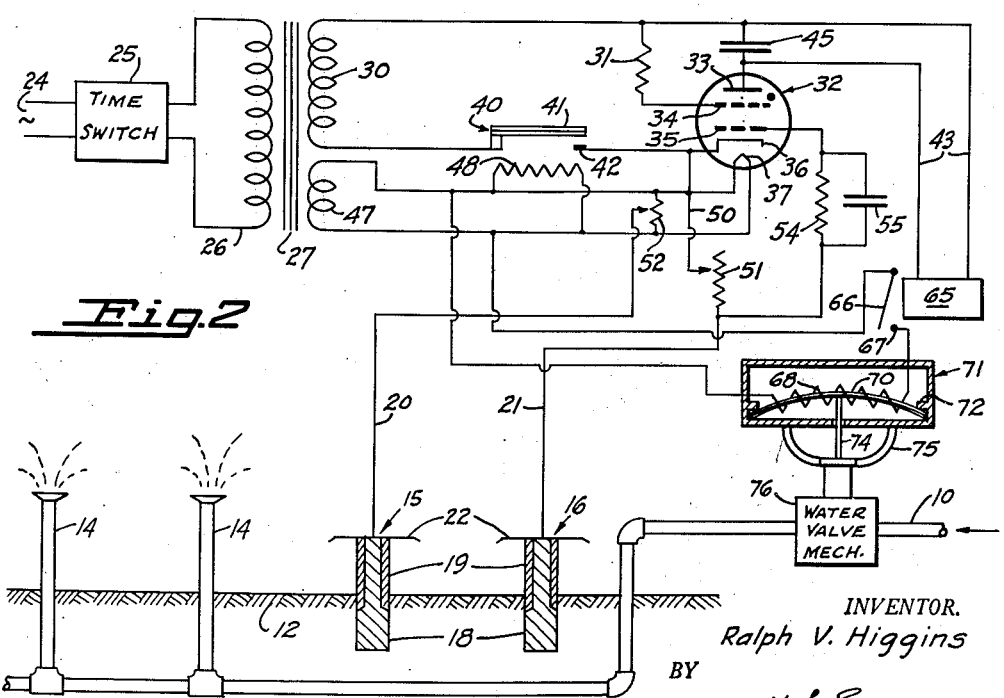
INVENTOR.
Ralph V. Higgins
BY
H. L. Godfrey
ATTORNEY Patented Sept. 23, 1952

2,611,643

UNITED STATES PATENT OFFICE 2,611,643

AUTOMATIC SPRINKLING DEVICE

Ralph V. Higgins, San Francisco, Calif.

Application September 26, 1947, Serial No. 776,395

4 Claims. (Cl. 299—25)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (ch. 460, 45 Stat. L. 467).

This invention relates to an automatic sprinkling system and more particularly to a sprinkling system which will automatically maintain an adequate moisture content within the soil.

In some geographical areas, at least during certain seasons of the year, it is necessary to supply water to plants by irrigation in order that they may have sufficient moisture to sustain life and grow.

It has been customary to water lawns, flowers, shrubs, gardens and farms by manual operation of a valve admitting water to the irrigating system. The valve is left open until the soil is assumed to be moist enough to last for a half day, a day, or maybe a week, depending on the type of soil, temperature, rainfall and the weather in general. This system depends mainly on visual observation and guesswork even though efficiently handled. It results in at times applying too much water to the detriment of the plants and with a waste of water. At other times, through neglect, as well as misjudgment the plants may be insufficiently watered. The opening and closing of a valve (especially if there are many valves in a large spray system) many times during a season requires many man hours.

In some areas plants cannot be irrigated during certain portions of the day since they become mildewed if watered during that time. In these areas an automatic irrigating system must be prevented from watering during an improper period.

It is an object of this invention to provide a system for automatically maintaining the moisture in the soil at approximately a predetermined level.

It is a further object of this invention to provide an automatic irrigating system that will irrigate only during the desired portion of the day.

It is a further object of this invention to provide an automatic irrigating system that is simple in design and inexpensive to manufacture.

It is a further object of this invention to provide an automatic irrigating system that operates in response to the electrical resistivity of the soil.

These and other objects will become apparent from the following specification taken in connection with the accompanying drawings in which:

Fig. 1 is a schematic diagram of a system incorporating the principles of my invention.

Fig. 2 is a schematic diagram showing a modification of the operating mechanism for the water valve used in my invention.

In Fig. 1 water supply pipe 10 in which is included a valve 11 enters the soil 12 and is connected to sprinklers 14—14. Inserted in the soil 12 are electrodes 15 and 16 each of which consists of a central portion 18 preferably made of a relatively corrosion resistant metal such as brass or stainless steel. The upper part of the portion 18 is of smaller diameter than the lower part and over the part of smaller diameter is placed a closely fitting cylinder 19 of insulating material such as Bakelite. Wires 20 and 21 are electrically connected to the top of portions 18 of electrodes 15 and 16, respectively. Umbrella-like members 22 may be provided at the top of the electrodes 15 and 16 and serve to prevent water from running down the sides of the electrode and saturating the soil immediately adjacent thereto.

Alternating current supply 24, which is preferably the usual 110-volt house supply voltage, is connected through a time switch 25 to primary 26 of transformer 27. Time switch 25 may be any time switch capable of connecting the supply voltage 24 to primary 26 during a predetermined portion of the day. The time switch 25 may be a commercially available model or may be constructed by placing an elongated contact on the hour hand of an alarm clock but preferably is the sun actuated device disclosed by me in Patent 2,524,796, granted October 10, 1950, on application Serial No. 718,725, filed December 27, 1946.

Transformer 27 has a secondary 30 which supplies a relatively high plate potential to Thyratron tube 32. Tube 32 includes an anode 33, a shield grid 34, control grid 35, a thermionic cathode 36, and a cathode heater 37. One terminal of the secondary 30 is connected through thermal switch 40 to cathode 36. Thermal switch 40 may be a bi-metallic strip 41 which engages contact 42 when sufficiently heated. The other terminal of the secondary 30 is connected through solenoid coil 44 to plate 33 of tube 32. Solenoid 44 is connected to the rest of the circuit by wires 43. Condenser 45 is connected in parallel with solenoid coil 44. Shield grid 34 is connected through resistor 31 to the junction of secondary 30 and coil 44.

Transformer 27 also includes a secondary 47 which supplies a relatively low potential to heater element 37 of tube 32. Secondary 47 when energized also causes a current to flow through resistor 48 mounted in close proximity to bi-metallic strip 41 of thermal switch 40 to supply heat thereto.

Secondary 47 also supplies a potential across electrodes 15 and 16. One terminal of secondary 47 is connected through wire 50, rheostat 51, and wire 21 to electrode 16. Wire 20 from electrode 15 is connected to the adjustable mid tap on potentiometer 52, the end terminals of which are connected across secondary 47.

Electrode 16 is also connected through wire 21, rheostat 51 and wire 50 to cathode 36 of tube 32. The junction of resistor 51 and electrode 16 is connected to control grid 35 of tube 32 through the parallel circuit including resistor 54 and condenser 55.

Valve 11 is operated by the axial movement of valve stem 57 which is moved by lever 58 pivoted on fulcrum 59. The end of fulcrum 58 remote from valve stem 57 is pivotally connected to solenoid core 62. Valve stem 57 is normally maintained in a closed position through action of compression spring 63 which exerts a force against link 58 between fulcrum 59 and core 62.

In the operation of the system shown in Fig. 1, when the proper period of the day for watering arrives, the time switch 25 will operate to connect alternating voltage source 24 to the primary 26 of transformer 27. When transformer 27 is initially energized, plate potential is not applied to tube 32 because thermal switch 40 is open. This condition is desirable because longer life from a Thyratron tube 32 is obtained if plate potential is applied only after cathode 36 has arrived at its normal operating temperature through action of heating element 37. As soon as transformer 27 is energized, secondary 47 passes current to heater 37 which begins heating cathode 36 to operating temperature. When secondary 47 is energized current also is immediately passed through resistor 48 which begins to heat bi-metallic strip 41 of thermal switch 40. Bi-metallic strip 41 and resistor 48 are arranged so that thermal switch 40 closes, applying plate potential to tube 32 at the time when cathode 36 arrives at operating temperature.

The current from secondary 47 passing through potentiometer 52, wire 20, electrode 15, soil 12, electrode 16, wire 21, resistor 51 and wire 50 depends on the resistivity of soil 12 and hence is a measure thereof. Potentiometer 52 is provided to allow adjustment of the system to the particular soil in which it is used and to allow adjustment from time to time in one location if the mineral salts in the irrigation water vary considerably over a period of time so as to cause a considerable change in the resistivity of the soil at a given water content. Variable resistor 51 allows adjustment of the soil resistivity and hence moisture content which will cause operation of the irrigation system.

When the moisture content of soil 12 drops to an amount determined by the setting of resistor 51, a sufficiently low current will pass through the electrodes 15—16 and soil 12 so that the negative bias placed on grid 35 will be too low to prevent conduction in gaseous tube 32. When tube 32 is thus energized plate current will flow from secondary 30 through tube 32 and through solenoid coil 44. Core 62 is thus drawn down into coil 44 and lever 58 is tilted against the compression of spring 63, raising valve stem 57 and operating valve 11 to allow water flow into sprinklers 14, wetting the soil 12.

As the soil 12 becomes wet from the action of sprinklers 14 its resistivity will drop. When the moisture content of soil 12 has increased to lower its resistivity sufficiently an increased amount of current will flow between electrodes 15 and 16 through soil 12 and a sufficient negative bias will be placed on control grid 35 to prevent the striking of an arc in tube 32. Conduction through tube 32 is thus cut off, solenoid coil 44 is deenergized and spring 63 operates to close valve 11 shutting the water supply off from sprinklers 14.

Condenser 45 is connected in parallel with solenoid coil 44 to aid in smoothing out the current flow through coil 44 and prevent chattering of solenoid core 62. Resistor 54 and condenser 55 partially smooth the alternating potential before it is impressed on control grid 35. This parallel circuit including resistor 54 and condenser 55 combined with the action of shield grid 34 and resistor 35 narrows the range through which the moisture content must change in order to close the valve 11 after sprinkling has started. This narrow range is helpful in controlling the water content of very moist soils.

In Fig. 2 is shown an alternate arrangement for controlling the flow of water from supply pipe 10 to sprinklers 14. In place of solenoid coil 44 as shown in Fig. 1 a magnet coil 65 is connected to wires 43 in the circuit including secondary 30 and the anode and cathode of tube 32. Magnet 65 when energized through wires 43 draws armature 66 into engagement with contact 67 connecting the potential of secondary 47 across a resistor 68 wound around a bi-metallic strip 70. Bi-metallic strip 70 is enclosed in a housing 71, held in place by flange 72. Valve stem 74 enters through a hole in housing 71 and is attached to the mid portion of bi-metallic strip 70. Valve stem 74 operates a pilot valve which through water pressure released by the pilot valve operates a piston which turns a large valve such as 11 in Fig. 1, allowing water to flow from supply pipe 10 to sprinklers 14. Housing 71 is supported by yoke 75 on water valve mechanism 76 which contains the main valve and pilot valve. Such a valve arrangement including a pilot valve is shown in my Patent 2,524,796, referred to above.

In Fig. 2 the elements designated by reference numerals 24—27, 31—37, 40—43, 45, 48, 50—52, 54, and 55 are identical with the elements referenced by those numerals in Fig. 1 and operate in the same manner as described above with respect to Fig. 1.

In the operation of the modification shown in Fig. 2, conduction through tube 32 applies an operating voltage to magnet 65 which causes the voltage of secondary 47 to be applied through armature 66 and contact 67 to resistor 68. Bi-metallic strip 70 is heated and becomes more curved, pulling valve stem 74 upward to operate first the pilot valve and then the main valve and apply water through the sprinklers 14.

This invention provides a sprinkling system utilizing the resistivity of the ground as a control. Since a low voltage is used on the electrodes the device is non-shocking even though these electrodes are handled with bare hands. Since the voltage applied to the electrodes is alternating the electrodes do not become polarized which would increase the effective resistance between the electrodes and would interfere with accurate irrigation control by the moisture content of the soil. Although the resistivity of the soil changes very slowly the valve is always turned either on or off and never attempts to vibrate between these two conditions as the soil resistivity approaches the operating point. It will be understood that this system could be used to control irrigation through overhead sprinkling pipes, ditches, or any other system of irrigation.

It is within the scope of this invention to modify the system of Fig. 1 so that the water valve 11 is opened when the moisture content of the soil drops to a first predetermined level which is relatively low and is closed when said moisture content rises to a second predetermined level which is relatively high. This may be accomplished by a second relay means which may include one or more electronic tubes and which alters the connection of resistance capacitance circuits 54—55 upon conduction through tube 32, said alteration existing to control initiation of conduction of at least the succeeding cycle. Thus tube 32 will initially start to conduct at a relatively low soil resistivity and will continue to conduct until the soil reaches a relatively high resistivity when it will cease to conduct. However, in practice it has been found that the system of Fig. 1 is at least as good as the system controlled by the relatively high and relatively low resistances and has the advantage of greater simplicity.

The system shown above is exemplary only and many modifications will occur to those skilled in the art within the scope of the appended claims.

What is claimed is:

1. An irrigating apparatus including means for applying water to the soil, two electrodes inserted in the soil, a gaseous electronic discharge device including at least a thermionic cathode, an anode and a control grid, a transformer including at least a primary and a first and second secondary, said primary being connected to a source of alternating potential and inducing in said first and second secondaries a relatively high and relatively low alternating potential respectively, said first secondary being connected in series with said cathode, anode, and an electrical device for controlling said water applying means, means connecting at least part of the alternating potential of said second secondary across a series circuit including a resistor, said two electrodes and the soil between said two electrodes, means including a parallel connected resistor and condenser for connecting the junction between said resistor and one of said electrodes to said control grid, and means for connecting the end of said resistor remote from said one electrode to said cathode.

2. The combination of claim 1, in which means are provided for disconnecting the source of alternating potential from the primary of said transformer during at least a predetermined portion of the day.

3. In combination, a gas filled electronic discharge device having at least a thermionic cathode, an anode and a control grid, a transformer having at least a primary and first and second secondaries, said first secondary having a relatively high number of turns to produce a relatively high alternating potential, and said second secondary having a relatively low number of turns to produce a relatively low alternating potential, means connecting said anode and cathode in a load circuit including said first secondary and an electrical operating means for controlling water flow, two electrodes adapted to be inserted in the soil, means connecting at least part of the alternating potential of said second secondary across said two electrodes in a circuit including a resistor, and means including a parallel connected resistor and condenser for connecting the voltage developed across said resistor across the said cathode and said control grid.

4. In combination a gas-filled electronic discharge device having at least a thermionic cathode, an anode and a control grid, a transformer having at least a primary and first and second secondaries, said first and second secondaries being adapted to produce a relatively high and a relatively low alternating potential respectively upon energization of the primary by a source of alternating potential, means for connecting said anode and cathode in a load circuit including said first secondary and an electrical operating means for controlling water flow, two electrodes adapted to be inserted in the soil, means for applying at least part of the alternating potential of said second secondary to said two electrodes, means for causing the current flow between said two electrodes to control conductivity of said electronic discharge device through said control grid, the electrical device for operating said water applying means including a bi-metallic strip, movement of which causes operation of a water valve, said bi-metallic strip being heated by a resistor energized by said anode-cathode current.

RALPH V. HIGGINS.

REFERENCES CITED

The following references are of record in the file of this patent:

UNITED STATES PATENTS

| Number | Name | Date |
|---|---|---|
| 2,002,774 | Hammer | May 28, 1935 |
| 2,031,146 | Dodge | Feb. 14, 1936 |
| 2,064,651 | Fiene | Dec. 15, 1936 |
| 2,073,701 | Lazzarini | Mar. 16, 1937 |
| 2,327,690 | Ackerman | Aug. 24, 1943 |
| 2,358,433 | Wolfner | Sept. 19, 1944 |
| 2,431,429 | Sepavich | Nov. 25, 1947 |
| 2,432,390 | Darby | Dec. 9, 1947 |
| 2,439,680 | Volz | Apr. 13, 1948 |
| 2,558,063 | Seyffert | June 26, 1951 |